(12) United States Patent
Gebrig et al.

(10) Patent No.: US 8,449,688 B2
(45) Date of Patent: May 28, 2013

(54) HIGH-PRESSURE LIQUID ATOMISATION NOZZLE FOR A MACHINE FOR CLEANING OPTICAL LENSES OR OTHER SUBSTRATES

(76) Inventors: Jean Gebrig, Viry (FR); Denis Gehrig, St. Julien en Genevois (FR)

( * ) Notice: Subject to any disclaimer, the term of this patent is extended or adjusted under 35 U.S.C. 154(b) by 0 days.

(21) Appl. No.: 12/792,996

(22) Filed: Jun. 3, 2010

(65) Prior Publication Data
US 2010/0236585 A1      Sep. 23, 2010

Related U.S. Application Data

(63) Continuation of application No. 11/587,320, filed as application No. PCT/EP2006/003575 on Apr. 19, 2005, now abandoned.

(30) Foreign Application Priority Data

Apr. 19, 2005    (EP) .................................... 05008558

(51) Int. Cl.
*B08B 3/02*    (2006.01)
(52) U.S. Cl.
USPC .......... 134/34; 134/198; 134/199; 239/284.1; 239/548; 239/568

(58) Field of Classification Search
USPC ................ 134/198; 239/284.1, 450, 548, 568
See application file for complete search history.

(56) References Cited

U.S. PATENT DOCUMENTS 3,931,790 A * 1/1976 Franz ............................... 118/73
6,315,221 B1 * 11/2001 Goenka et al. ................ 239/589

FOREIGN PATENT DOCUMENTS

EP    1306136 A1 *  5/2003

* cited by examiner

*Primary Examiner* — Michael Kornakov
*Assistant Examiner* — Ryan Coleman
(74) *Attorney, Agent, or Firm* — The Weintraub Group, P.L.C.

(57) ABSTRACT

High-pressure washing liquid spray intended for use in a washing machine for ophthalmic glass or other substrates, consisting of an entry opening (11) for washing liquid and an exit opening (12) for liquid in a jet, connected by a channel. The channel (1) has a rectangular channel in cross section which introduces a constriction, in particular in the center, giving that channel an X shape, so as to form, on one hand, downstream of the above-mentioned constriction, an expanded exit cavity (13) ending in a slit forming the exit opening (12) and, upstream of the above-mentioned constriction on the other hand, an entry cavity (14) in the base cone where the rectangular base forms the entry opening (11) of the channel (1).

4 Claims, 2 Drawing Sheets

Figure 1:
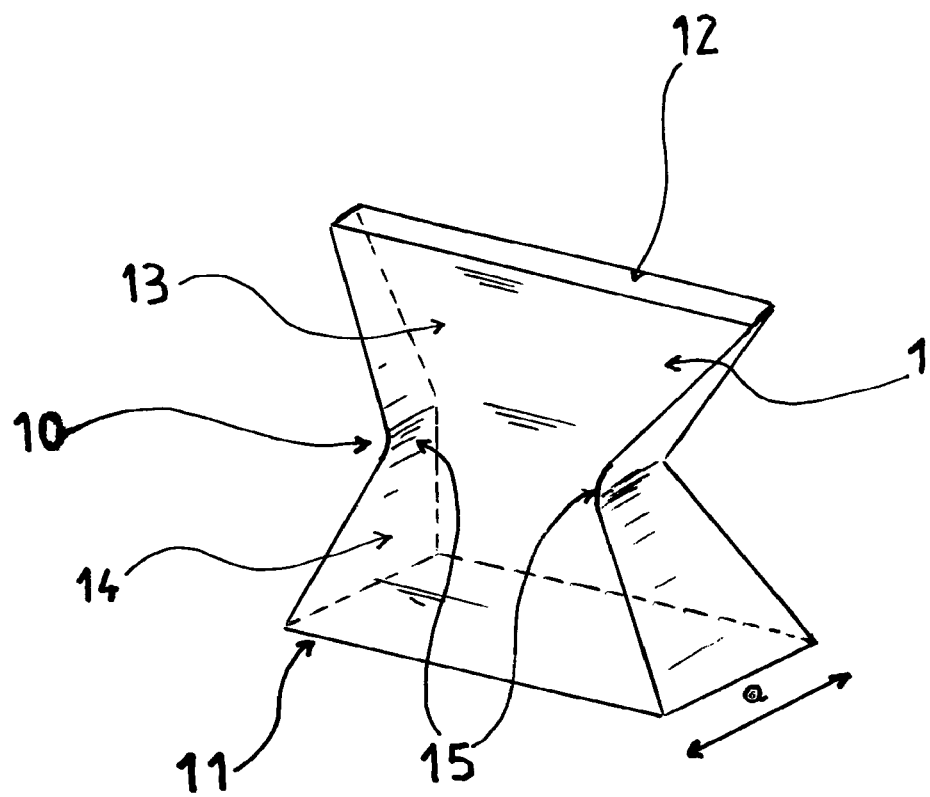

HIGH-PRESSURE LIQUID ATOMISATION NOZZLE FOR A MACHINE FOR CLEANING OPTICAL LENSES OR OTHER SUBSTRATES

This application is a continuation of U.S. patent application Ser. No. 11/587,320, filed Jul. 16, 2007, now abandoned, which was the National Stage of International Application No. PCT/EP06/03575, filed Apr. 19, 2006, the entire disclosures of which are hereby incorporated by reference.

The purpose of this invention is a nozzle for a high pressure washing liquid spray intended for use in a washing machine for ophthalmic glass or other substrates.

Spray nozzles used in the existing ophthalmic glass washing machines allow application on the surface of the glass by contact with the latter by a high-pressure liquid washing jet in a plane form, and they usually consist of a cylindrical body on each of the plane sides, which are applied respectively to the entry opening of the high pressure washing liquid and the outlet opening of the liquid jet outlet, mentioned openings are connected by a channel.

However, the existing spray nozzles do not allow attainment of an effective result. Indeed, the channels that are used in the nozzles generate "Venturi" effects that create air bubbles, and their presence in the liquid jet projecting from the outlet of the spray nozzles does not allow the whole glass surface touched by the abovementioned jet to be in contact with the liquid, which results in leaving glass surface parts unclean.

To address this problem, a solution is to program several passages of the washing liquid jet to the surface of the glass to be cleaned, but this decreases the productivity of the washing machine.

The purpose of this invention is to eliminate these disadvantages by offering a high pressure washing liquid spray for cleaning glass surfaces in particular, or other similar parts, and making it possible to spray a high pressure liquid layer from the outlet of the nozzle tip without air bubbles by allowing all surface glass touched by the layer to be in contact with the liquid for a more effective result and better productivity than existing nozzles provide. According to this invention, the spray nozzle consists of an entry opening for the washing liquid and an opening for the liquid jet connected by a rectangular channel in cross section which introduces a constriction, in particular in the center, giving that channel an X shape, so as to form, on one hand, downstream of the abovementioned constriction, an expanded exit cavity ending in a slit forming the exit opening and, upstream of the abovementioned constriction on the other hand, an entry cavity in the base cone where the rectangular base forms the entry opening of the channel.

According to this invention, the width of the rectangular section of the channel increases gradually from its outlet opening to its inlet opening. The internal wall of the constriction that ensures the connection between the entry cavity and the exit cavity will preferably be rounded towards the inside of the passage.

The advantages and characteristics of this invention will be shown more clearly in the description that follows and by reference to the attached drawing, which represents a nonrestrictive mode of performance.

According to this invention, FIG. 1 represents a general view drawing of the channel connecting the outlet opening and the inlet opening of the spray nozzle.

Figure 2:
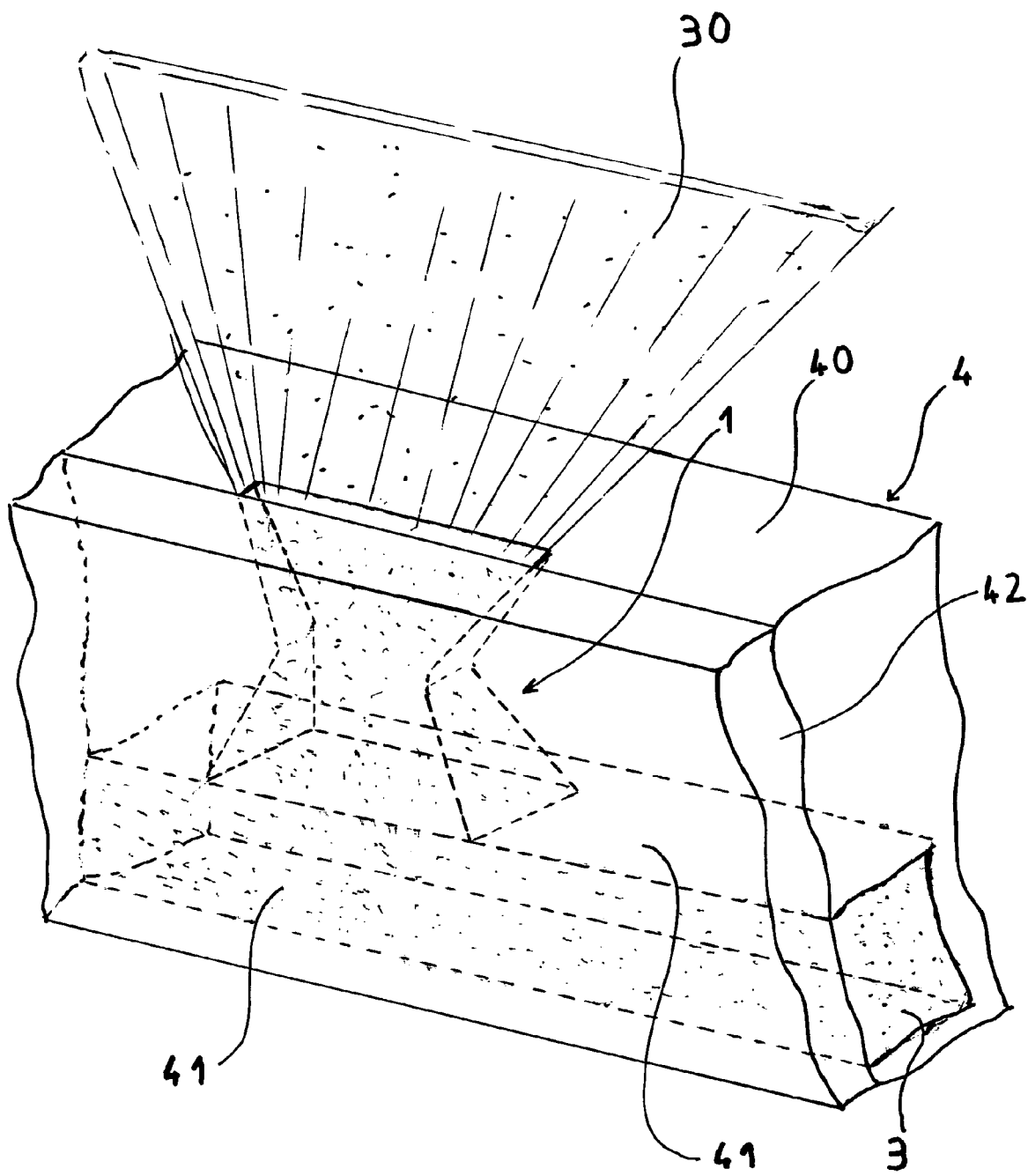

According to this invention, FIG. 2 represents a general view drawing of a spray device for an ophthalmic glass washing machine including a spray nozzle.

FIG. 1 shows that according to this invention, on one side the spray nozzle consists of rectangular cross section channel 1 crossing the frame of the nozzle, not presented, and presenting constriction 10, located at the median axis level, giving it, in a preferred production cycle, a vertical profile in the form of an X. Each end of the X respectively forms inlet opening 11 and outlet opening 12 of channel 1 of the spray nozzle, outlet opening 12 being placed carefully in the frame of the nozzle so that 10 its opening is much longer in length than in width to form a spray slit allowing a jet of liquid to be forced out in the shape of a thin layer. Inlet opening 11 is intended to be connected to a distribution box to feed the spray nozzle channel with the high-pressure washing liquid and presents the form of a window with a width bigger than that of outlet opening 12 in the shape of a slit. The longer sides of the inlet opening 11 are parallel the longer sides of outlet opening 12.

The width (A) of channel 1, which also may be considered as its depth, gradually decreases from the inlet opening 11 to the outlet opening 12.

Channel 1 consists of exit cavity 13 in a V shape downstream from its constriction 10 and, on the other hand, upstream, constriction entry cavity 14 in the base cone with a rectangular base forming the inlet opening 11.

The function of exit cavity 13 is to allow projection from slit 12 of a jet of liquid in the shape of a thin plate, while widening entry cavity 14 located in the upstream exit cavity 13, the function of which is to allow the introduction of the high pressure washing liquid into nozzle channel 10 with minimal resistance and without gaps; i.e., maintaining the pressure in the washing liquid lower than its vapor pressure, preventing the formation of air bubbles in the liquid at the time of its entry into exit cavity 13. Interior wall 15 of constriction 10 ensuring the connection between the inlet opening 11 and the outlet opening 12 is rounded towards the internal channel 10, allowing the liquid to maintain contact with the internal wall of channel 10 during its travel from the inlet opening 11 to the exit cavity 12 to prevent any formation of air bubbles.

The liquid jet projected at the nozzle exit by the outlet opening 12 thus presents a form of spread layer without the Venturi effect and air bubbles, making it possible to clean ophthalmic glass surface more effectively without leaving any parts of the surface unclean.

Numerous tests demonstrated that the surface of inlet opening 11 is six times larger than that of the outlet opening 12, and liquid pressure of 8 and 20 bars allows the user to obtain a liquid layer without air bubbles at a speed higher than or equal to 200 km/h in the flow system at the nozzle exit with the channel width ranging between 0.15 and 0.30 mm.

According to this invention, FIG. 2 shows a nozzle integrated into distribution device 4, consisting of device frame 40 on one of the long sides, which, according to this invention, are applied at even intervals to channel 10 in the shape of X, only one being represented on the figure, and distribution box 41, containing high pressure washing liquid 3, feeding each channel 10 from its rectangular inlet opening 11 and coming out of the box 41, from which liquid 3 is projected at high speed in the shape of a spread layer 30 without air bubbles. You can also see that device lid 42 covers the long side of device 40, to which according to this invention, the spray channels 10 are applied. The distance between channels 10 of each spray nozzle will be specified so that the liquid layers 30 projected at exit 12 of the spray nozzles can overlap in order to obtain only one liquid layer of the same size as or bigger than the diameter of the glass that needs to be cleaned by the contact of the resulting layer with the surface of the glass.

What is claimed is:

1. A high-pressure washing liquid sprayer for use in a washing machine for washing a substrate, comprising: (a) an entry opening for washing liquid and (b) an exit opening for liquid in a jet, the entry and exit openings connected by a channel crossed by a stream of liquid, said channel having a rectangular cross section having a central constriction, giving that channel an X shape, so as to form, (i) downstream of the constriction, an expanded exit cavity ending in a slit forming the exit opening, the exit cavity being free of any obstruction, and, (ii) upstream of the constriction, an entry cavity having a frustum of pyramid shape with a rectangular base forming the entry opening of the channel, and wherein, across the entire distance between the exit opening to the entry opening, the width of the rectangular cross section of the channel gradually increases from the exit opening towards the entry opening of the channel, and wherein the sprayer enables the stream of liquid crossing the channel to be devoid of bubbles.

2. The high-pressure washing liquid sprayer according to claim 1 characterized by an inner wall of the constriction ensuring a connection between the entry opening and the exit opening is rounded towards the interior of the channel.

3. A method for using a plurality of high pressure washing liquid sprayers that each have the structure recited in claim 1, comprising:

a) providing a jet body for each sprayer, each jet body being formed by the channel of one sprayer;

b) providing a distribution chamber, the channels being placed at regular intervals in the chamber, each channel having an entry opening and an exit;

c) feeding liquid into the entry opening of each channel through the distribution chamber;

d) projecting the liquid at high speed from each exit of each channel, the liquid being projected from the exits to form a single spread layer;

e) cleaning a glass surface by contacting the glass with the single spread layer, the layer having a width equal to or greater in diameter than the glass surface to be cleaned.

4. The method of claim 3 wherein the single spread layer is devoid of bubbles.

* * * * *

UNITED STATES PATENT AND TRADEMARK OFFICE
CERTIFICATE OF CORRECTION

PATENT NO. : 8,449,688 B2  
APPLICATION NO. : 12/792996  
DATED : May 28, 2013  
INVENTOR(S) : Jean Gehrig et al.

It is certified that error appears in the above-identified patent and that said Letters Patent is hereby corrected as shown below:

On the Title page of the patent; Item (76)

-- the first inventor's last name is misspelled (GEBRIG),

The correct spelling should be: GEHRIG

Signed and Sealed this
Twenty-third Day of July, 2013

Teresa Stanek Rea
*Acting Director of the United States Patent and Trademark Office*